(12) United States Patent
Kamerbeek et al.

(10) Patent No.: US 9,131,799 B2
(45) Date of Patent: Sep. 15, 2015

(54) SYSTEM, APPARATUS AND METHOD FOR PREPARING A BEVERAGE

(75) Inventors: Ralf Kamerbeek, De Meern (NL); Angenita Dorothea van Loon-Post, Utrecht (NL); Hendrik Cornelis Koeling, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 0 days.

(21) Appl. No.: 13/316,418

(22) Filed: Dec. 9, 2011

(65) Prior Publication Data
US 2012/0251692 A1 Oct. 4, 2012

Related U.S. Application Data

(63) Continuation of application No. PCT/NL2009/050819, filed on Dec. 30, 2009.

(30) Foreign Application Priority Data

Jun. 17, 2009 (EP) .................................. 09162920
Jun. 17, 2009 (EP) .................................. 09163013

(51) Int. Cl.
*A47J 31/00* (2006.01)
*A47J 31/36* (2006.01)
*A47J 31/06* (2006.01)

(52) U.S. Cl.
CPC ............ *A47J 31/368* (2013.01); *A47J 31/0673* (2013.01); *A47J 31/3628* (2013.01)

(58) Field of Classification Search
USPC ..................... 99/295, 302 R, 289 R
See application file for complete search history.

(56) References Cited

U.S. PATENT DOCUMENTS 3,615,708 A 10/1971 Abile-gal
4,321,139 A 3/1982 Auclair
(Continued)

FOREIGN PATENT DOCUMENTS

EP 1344722 B2 11/2006
EP 1859712 A1 * 11/2007
(Continued)

OTHER PUBLICATIONS

International Search Report for PCT/NL2009/050819 dated Mar. 2, 2010, 3 pages.
(Continued)

*Primary Examiner* — Dana Ross
*Assistant Examiner* — John J Norton
(74) *Attorney, Agent, or Firm* — Foley & Lardner LLP (57) ABSTRACT

A system for preparing a predetermined quantity of beverage suitable for consumption using an extractable product is disclosed. The system comprises a first exchangeable capsule, being a closed capsule, having a bottom; a second exchangeable capsule, being an open capsule, having a bottom comprising an entrance filter; a first apparatus comprising a receptacle with a support surface for holding a first capsule, the first apparatus having bottom piercing means intended for piercing the bottom of the first capsule, and having a fluid dispensing device for supplying an amount of a fluid, such as water, under pressure to the first capsule; a second apparatus comprising a receptacle with a support surface for holding a second capsule, and a fluid dispensing device for supplying an amount of a fluid, such as water, under pressure to the second capsule.

11 Claims, 3 Drawing Sheets

(56) References Cited

U.S. PATENT DOCUMENTS

| | | | |
|---|---|---|---|
| 4,417,504 | A | 11/1983 | Yamamoto |
| 4,859,337 | A | 8/1989 | Woltermann |
| 5,008,013 | A * | 4/1991 | Favre et al. .................. 210/482 |
| 5,325,765 | A | 7/1994 | Sylvan et al. |
| 5,472,719 | A * | 12/1995 | Favre ............................. 426/77 |
| 5,840,189 | A | 11/1998 | Sylvan et al. |
| D408,679 | S | 4/1999 | Potts et al. |
| 5,897,899 | A | 4/1999 | Fond |
| 6,079,315 | A | 6/2000 | Beaulieu et al. |
| 6,082,247 | A | 7/2000 | Beaulicu |
| 6,142,063 | A | 11/2000 | Beaulieu et al. |
| 6,182,554 | B1 | 2/2001 | Beaulieu et al. |
| D452,433 | S | 12/2001 | Lazaris |
| D452,434 | S | 12/2001 | Sweeney |
| 6,440,256 | B1 | 8/2002 | Gordon et al. |
| D462,865 | S | 9/2002 | Honan et al. |
| D474,110 | S | 5/2003 | Sweeney |
| D474,111 | S | 5/2003 | Lazaris |
| 6,589,577 | B2 | 7/2003 | Lazaris et al. |
| 6,606,938 | B2 | 8/2003 | Taylor |
| 6,607,762 | B2 | 8/2003 | Lazaris et al. |
| 6,644,173 | B2 | 11/2003 | Lazaris et al. |
| 6,645,537 | B2 | 11/2003 | Sweeney et al. |
| 6,655,260 | B2 | 12/2003 | Lazaris et al. |
| 6,658,989 | B2 | 12/2003 | Sweeney et al. |
| 6,666,130 | B2 | 12/2003 | Taylor et al. |
| 6,672,200 | B2 | 1/2004 | Duffy et al. |
| 6,708,600 | B2 | 3/2004 | Winkler et al. |
| D489,215 | S | 5/2004 | Honan et al. |
| 6,810,788 | B2 * | 11/2004 | Hale ............................... 99/295 |
| 6,832,542 | B2 * | 12/2004 | Hu et al. ..................... 99/302 R |
| D502,362 | S | 3/2005 | Lazaris et al. |
| D513,572 | S | 1/2006 | Schaffeld et al. |
| 7,165,488 | B2 | 1/2007 | Bragg et al. |
| D544,299 | S | 6/2007 | Schaffeld et al. |
| D554,299 | S | 10/2007 | Ragonetti et al. |
| 7,325,479 | B2 * | 2/2008 | Laigneau et al. ............... 99/295 |
| 7,347,138 | B2 | 3/2008 | Bragg et al. |
| 7,360,418 | B2 | 4/2008 | Pelovitz |
| 7,377,162 | B2 | 5/2008 | Lazaris |
| 7,398,726 | B2 | 7/2008 | Streeter et al. |
| 7,412,921 | B2 * | 8/2008 | Hu et al. ......................... 99/295 |
| 7,513,192 | B2 | 4/2009 | Sullivan et al. |
| 7,523,695 | B2 | 4/2009 | Streeter et al. |
| 7,543,527 | B2 * | 6/2009 | Schmed .......................... 99/295 |
| 7,552,672 | B2 | 6/2009 | Schmed |
| 7,640,845 | B2 | 1/2010 | Woodnorth et al. |
| 7,856,920 | B2 | 12/2010 | Schmed et al. |
| 2004/0045443 | A1 | 3/2004 | Lazaris et al. |
| 2005/0051478 | A1 | 3/2005 | Karanikos et al. |
| 2005/0183578 | A1 * | 8/2005 | Mandralis et al. ............... 99/279 |
| 2005/0205601 | A1 | 9/2005 | Taylor |
| 2005/0287251 | A1 | 12/2005 | Lazaris et al. |
| 2006/0172813 | A1 * | 8/2006 | Tiffin et al. ................... 473/257 |
| 2006/0174773 | A1 | 8/2006 | Taylor |
| 2006/0236871 | A1 * | 10/2006 | Ternite et al. .................... 99/295 |
| 2006/0292012 | A1 | 12/2006 | Brudevold et al. |
| 2008/0095904 | A1 | 4/2008 | Sullivan et al. |
| 2008/0115674 | A1 | 5/2008 | Huang et al. |
| 2008/0134902 | A1 | 6/2008 | Zimmerman et al. |
| 2010/0024658 | A1 | 2/2010 | Jacobs et al. |
| 2010/0303964 | A1 | 12/2010 | Beaulieu et al. |

FOREIGN PATENT DOCUMENTS

| | | | |
|---|---|---|---|
| EP | 1870349 | A2 * | 12/2007 |
| EP | 2442696 | | 4/2012 |
| FR | 2617389 | A1 * | 1/1989 |
| WO | WO 2004/083071 | A1 | 9/2004 |
| WO | WO 2004083071 | A1 * | 9/2004 |
| WO | WO 2006/003115 | A1 | 1/2006 |
| WO | WO 2006003115 | A1 * | 1/2006 |
| WO | WO 2006/126104 | A2 | 11/2006 |
| WO | WO 2006126104 | A2 * | 11/2006 |
| WO | WO 2008/046740 | A1 | 4/2008 |

OTHER PUBLICATIONS

Communication under Rule 71(3) EPC, Intention to Grant for European Patent Application No. 09 796 112.2, dated Dec. 13, 2013, 27 pages.

First Office Action and Search Report for Chinese Patent Application No. 200980160983.2, dated Oct. 24, 2013, 9 pages.

Notice of Final Rejection for Korean Patent Application No. 10-2012-7001247, dated Feb. 12, 2014, 3 pages.

Official Action for Mexican Application No. MX/a/2011/013271, no date, 2 pages.

Notice of the Reasons for Rejection for Japanese Patent Application No. 2012-516007, dated Jul. 1, 2014, 4 pages with English translation.

Office Action received in Russian Patent Application No. 2012101442/12(001947) dated Apr. 3, 2014, 8 pages with English translation.

* cited by examiner

SYSTEM, APPARATUS AND METHOD FOR PREPARING A BEVERAGE

CROSS-REFERENCE TO RELATED APPLICATIONS

The present application is a continuation of International Patent Application Ser. No. PCT/NL2009/050819 filed on Dec. 30, 2009; which claimed priority to European Patent Application Ser. Nos. 09163013.7 and 09162920.4, both filed on Jun. 17, 2009—all of which are hereby incorporated herein by reference.

FIELD OF THE INVENTION

The invention relates to a system for preparing a predetermined quantity of beverage suitable for consumption using an extractable product.

BACKGROUND

A known system for preparing a predetermined quantity of beverage suitable for consumption using an extractable product comprises: a first exchangeable capsule, being a closed capsule, having a bottom; a first apparatus comprising a receptacle with a support surface for holding a first capsule, the first apparatus having bottom piercing means intended for piercing the bottom of the first capsule, and having a fluid dispensing device for supplying an amount of a fluid, such as water, under pressure to the first capsule.

A special class of these systems can be used for preparing the beverage using a hermetically sealed closed capsule comprising the extractable product. During beverage preparation an entrance area of such closed capsule is pierced by the bottom piercing means of the system, hence providing at least one entrance opening for supplying the fluid under pressure to the exchangeable product in the inner space of the capsule through the entrance opening. Providing the fluid under pressure to the inner space causes the pressure in the inner space of the capsule to rise. This, in turn, causes an exit area of the closed capsule to be pressed against lid piercing means present in the support surface of the receptacle. When the exit area is pressed against the lid piercing means with sufficient force, the exit area tears against the lid piercing means creating at least one exit opening through which the beverage can drain from the capsule. When using a closed capsule (a capsule that in use is pierced with the bottom piercing means of the system to enable fluid to enter the inner space of the capsule) the piercing means also enable the closed capsule, more specifically the exit area thereof, to move from the outlet of the system, more in particular to move from the support surface of the apparatus.

During preparation of the beverage, an exit area of the capsule may stick against the support surface (of the apparatus) for instance because the exit area got wet during preparation of the beverage and/or due to the fluid pressure that also presses the exit area against at least part of the support surface and/or against the lid piercing means.

Because the bottom piercing means extend through the bottom of the prior art closed capsule, the material of the bottom encloses the bottom piercing means such that when retracting the receptacle, the bottom piercing means pull the prior art closed capsule from the support surface. When the receptacle is in the retracted position, the capsule can easily leave the receptacle, for instance by falling into a waste container provided in the system.

A further, non-prepublished, system provides application of a second exchangeable capsule, being an open capsule, having a bottom comprising an entrance filter. The open capsule can be placed in the first (prior art) apparatus. However, when using the open capsule in the first apparatus (i.e. after placement), the bottom piercing means of that apparatus will not pierce the entrance filter of the open capsule. Also, the entrance filter of the open capsule is preferably already adapted to supply fluid from the fluid dispensing device to the inner space of the open capsule.

When preparing a beverage with the system using an open capsule having an entrance filter that is not pierced, the open capsule might stick to the support surface upon retraction of the receptacle. Then it may be necessary to actively remove the capsule from the receptacle, for instance with a tool, a persons fingers or any other suitable means before being able to prepare another amount of beverage after inserting a further open capsule. If the user does not notice that the open capsule is stuck against the support surface, and inserts a further capsule, the capsule may be damaged upon closing of the receptacle resulting in a beverage of a poor quality, a beverage containing extractable product or even in a damaged apparatus.

It is therefore an object of the invention to provide an improved system according to the above described type. More in particular, it is an object of the invention to provide a system for preparing a predetermined quantity of beverage wherein the risk of capsules getting stuck in the receptacle is minimized.

SUMMARY

Thereto, according to a first aspect of the invention, the above-described system is characterized by a system for preparing a predetermined quantity of beverage suitable for consumption using an extractable product, including a first exchangeable capsule, being a closed capsule, having a bottom; a second exchangeable capsule, being an open capsule, having a bottom comprising an entrance filter; a first apparatus comprising a receptacle with a support surface for holding the first capsule, the first apparatus having bottom piercing means intended for piercing the bottom of the first capsule, and having a fluid dispensing device for supplying an amount of a fluid under pressure to the first capsule, the receptacle of the first apparatus being further configured to hold a second capsule; and a second apparatus comprising a receptacle with a support surface for holding the second capsule, and a fluid dispensing device for supplying an amount of a fluid under pressure to the second capsule, the receptacle of the second apparatus being further configured to hold the first capsule. The entrance filter of the second capsule, when being used in the first apparatus, is positioned at a distance from the bottom piercing means of the first apparatus, such that the second capsule is not pierced by the bottom piercing means and the bottom of the second capsule stays intact. The receptacle of the second apparatus comprises extended bottom piercing means for piercing the entrance filter of the second capsule for creating at least one opening in the entrance filter such that upon retraction of the receptacle the second capsule is moved in a retraction direction of the receptacle.

Advantageously, a system for preparing a predetermined quantity of beverage suitable for consumption using an extractable product, comprises: a first exchangeable capsule, being a closed capsule, having a bottom; a second exchangeable capsule, being an open capsule, having a bottom comprising an entrance filter; a first apparatus comprising a receptacle with a support surface for holding a first capsule, the first apparatus having bottom piercing means intended for piercing the bottom of the first capsule, and having a fluid dispensing device for supplying an amount of a fluid, such as water, under pressure to the first capsule; a second apparatus comprising a receptacle with a support surface for holding a second capsule, and a fluid dispensing device for supplying an amount of a fluid, such as water, under pressure to the second capsule; wherein the entrance filter of the second capsule, when being used in the first apparatus, is positioned at a distance from the bottom piercing means of the first apparatus, such that the capsule is not pierced by the bottom piercing means and the bottom of the capsule stays intact; wherein the receptacle of the second apparatus comprises lengthened bottom piercing means intended for piercing the entrance filter of the second capsule for creating at least one opening in the entrance filter such that upon refraction of the receptacle the capsule is moved in a retraction direction of the receptacle.

Thus, by providing lengthened bottom piercing means that are arranged for piercing the entrance area of the open capsule, the lengthened bottom piercing means extend through the entrance filter upon closing of the receptacle before preparing of the beverage. After preparation of the beverage the receptacle is retracted, thereby also moving the bottom piercing means in the retraction direction of the receptacle. Since the material of the entrance filter of the open capsule encloses the bottom piercing means, the capsule is moved along with the bottom piercing means in the retraction direction until the piercing means are removed from the entrance filter.

The initial connection force between the lengthened bottom piercing means and the entrance filter may be larger than a sticking force between the lid of the (open) capsule and at least part of the support surface of the receptacle, such that the capsule is released from the support surface of the receptacle before the capsule is removed from the lengthened bottom piercing means. Consequently, by providing the second apparatus with the lengthened bottom piercing means, the open capsule can easily leave the receptacle thereby providing a receiving opening in the apparatus that is ready to receive a further capsule for preparing a further predetermined quantity of beverage.

To provide the desired initial connection force between the lengthened bottom piercing means and the entrance filter of the second capsule, it may be advantageous, according to a further elaboration of the invention, if the lengthened bottom piercing means of the second apparatus of the system comprises at least one piercing element, such as a blade, having a length that is chosen such that a piercing end of the piercing element, in use, extends at least partially through the entrance filter of the open capsule. By providing lengthened bottom piercing means comprising at least two piercing elements arranged at substantially equal distance with respect to a capsule centre point, more specifically with respect to a bottom centre point, according to a further aspect of the invention, the capsule may be retracted in the retraction direction in a straight way without inclination or slanting. Hence, proper removal of the open capsule from the receptacle is further enhanced.

According to a further embodiment, the second capsule comprises a circumferential wall, a bottom closing the circumferential wall at a first end, and a lid closing the circumferential wall at a second end opposite the bottom, wherein the wall, bottom and lid enclose an inner space comprising the extractable product. For example, the lid comprises an exit area and the second apparatus can comprise an outlet which, in use, is in fluid communication with the exit area for draining the prepared beverage from the capsule and supplying the beverage to a container such as a cup. The bottom of the second capsule may comprise an entrance area and the system can be arranged for bringing the fluid dispensing device (of a second apparatus) in fluid connection with the entrance area for supplying the fluid to the extractable product for preparing the beverage.

A further advantage of said lengthened bottom piercing means is provided when a closed (first) capsule is used in the second apparatus of the system, wherein the lengthened bottom piercing means may comprise at least one piercing element that is adapted to, in use, pierce the closed capsule over at least 21.7% of its length along a longitudinal central axis of the closed capsule from the bottom towards the lid of the capsule. With such lengthened bottom piercing means a higher penetration depth of the piercing means in the inner space of the closed capsule is obtained, thereby providing optimal flow conditions for the fluid passing through the capsule itself, to the advantage of the quality and repeatability of the prepared beverage. In fact, the lengthened bottom piercing means may act as divider plates within the capsule and prevent the occurrence of preferential fluid flow paths through the extractable product. In addition the lengthened bottom piercing means may provide a further advantage in that the extractable product within the capsule is more intensively compacted just prior to the extraction process, which also is favourable from the view of the quality of the prepared beverage.

The invention also relates to a capsule of the above described system and to use of such a capsule of the system. The invention further relates to a method for preparing a predetermined quantity of beverage suitable for consumption using an extractable product according to claim 14. Such a capsule, use of a capsule and method may provide similar advantages and effects as described with the system. Further embodiments of the system, capsule and method are set forth in the dependent claims.

BRIEF DESCRIPTION OF THE DRAWINGS

The invention will now be further elucidated by means of, non-limiting, examples referring to the drawing, in which.

It is noted that identical or corresponding elements in the different drawings are indicated with identical or corresponding reference numerals.

DESCRIPTION OF EXEMPLARY EMBODIMENTS

Figure 1:
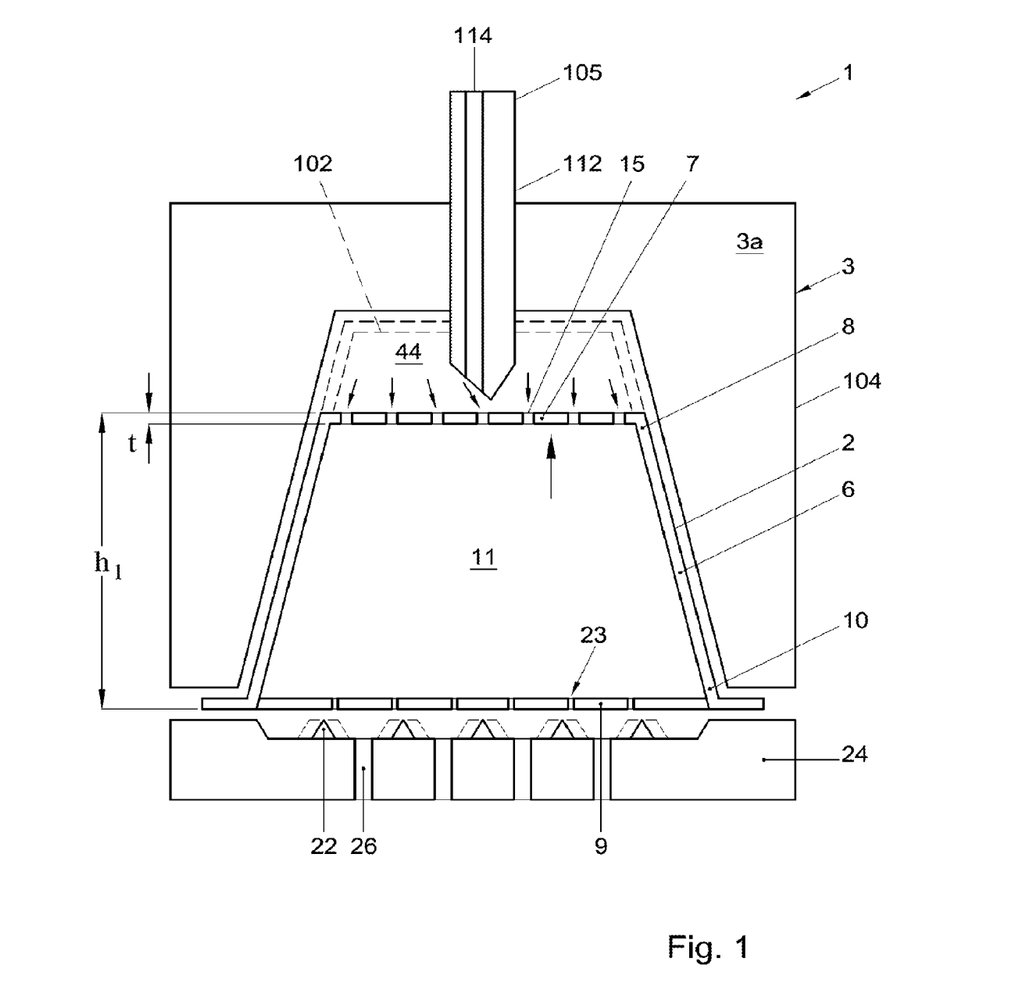
FIG. 1 schematically shows a prior art apparatus for preparing a beverage comprising an open capsule, wherein part of a closed capsule is indicated by dashed lines 102.
Figure 2:
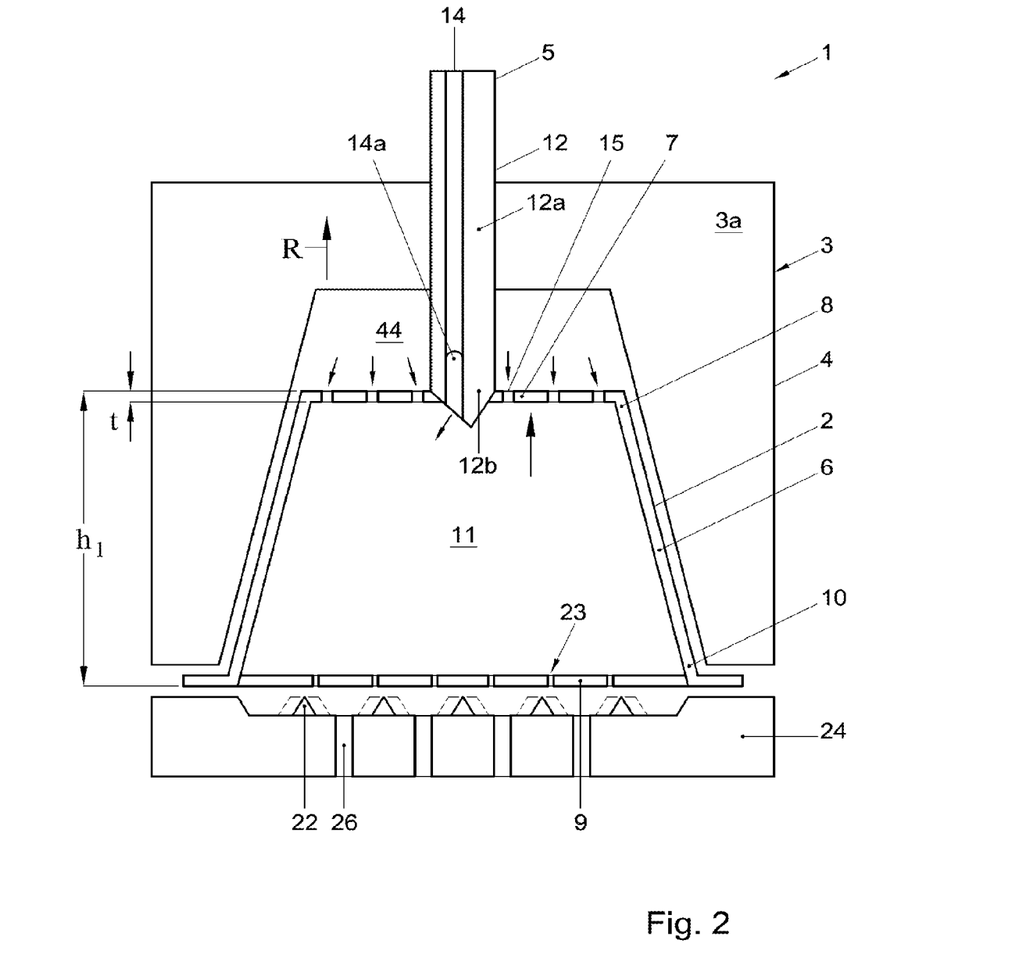
FIG. 2 schematically shows a first embodiment of a second apparatus the system according to the invention.
Figure 3:
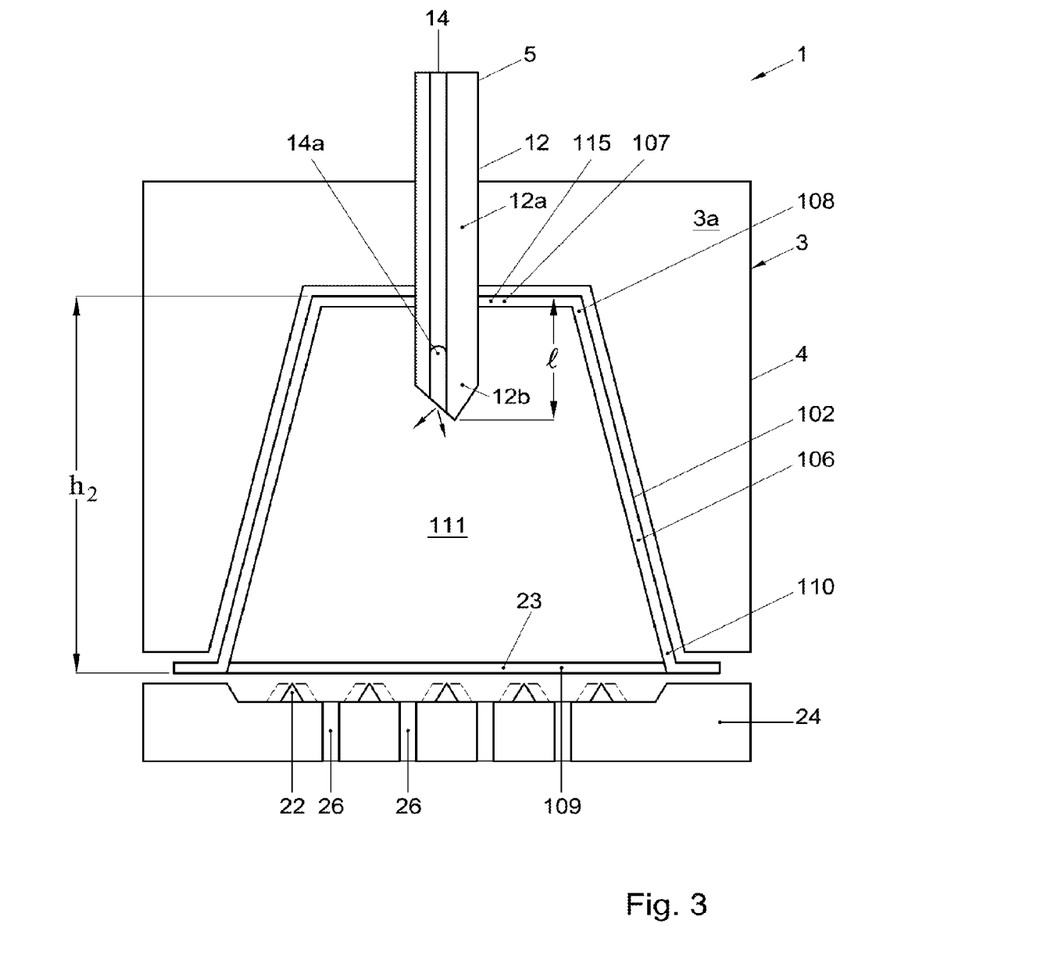
FIG. 3 schematically shows a second apparatus of the system according to an embodiment of the invention comprising a closed capsule.

FIG. 1 shows a first apparatus of the system 104, the first apparatus being a prior art apparatus 104 for preparing a predetermined quantity of beverage suitable for consumption using an extractable product. FIGS. 2-3 show an example of a second apparatus 4 of the system.

The first apparatus 104 comprising a receptacle 103 with a support surface 124 for holding a first (prior art) capsule 102. Part of a first capsule 102 is indicated by dashed lines in FIG. 1. FIG. 3 shows a first capsule, placed in a second apparatus 4.

As follows from FIG. 1, the first apparatus 104 has bottom piercing means 112 intended for piercing a closed bottom 107 (see FIG. 3) of the first capsule 102, and having a fluid dispensing device 105 for supplying an amount of a fluid, such as water, under pressure to the first capsule 102. Commonly, the receptacle 103 of the first apparatus has a shape complementary to the shape of the first capsule 102.

In FIG. 1, the first apparatus 104 comprises an exchangeable open capsule 2. The receptacle 103 can hold the exchangeable open capsule 2 (for example instead of a first, closed, capsule 102). Commonly, the receptacle 103 may have a shape partly complementary to the shape of the capsule 2. The fluid dispensing device 105 can supplying an amount of a fluid, such as water, under a pressure, of more than 6 bars, e.g. 9 bars, to the exchangeable capsule 2. For example, during operation, the said pressure can build up to 6 bars or more.

The exchangeable open (second) capsule 2, as provided in the receptacle 103 of the apparatus 104, comprises a substantially rigid circumferential wall 6, a bottom 7 closing the circumferential wall 6 at a first end 8, and a lid 9 closing the circumferential wall 6 at a second end 10 opposite the bottom 7. The circumferential wall 6, the bottom 7 and the lid 9 enclose an inner space 11 comprising the extractable product. Preferably, the extractable product comprises an amount of roasted and ground coffee.

As is mentioned before, the first apparatus 104 comprises bottom piercing means 112 intended for piercing (a closed bottom 107 of) a prior art closed capsule 102. The bottom piercing means 112 and the upper part 103a of the receptacle 103 as shown in FIG. 1 are in an extended position for creating an entrance opening 124 in the bottom 107 of the closed capsule 102 for supplying the fluid to the extractable product through the entrance opening. The bottom piercing means 112 comprise a bore 114 through which the fluid can be supplied to the extractable product contained in the inner space of the closed capsule 102. The first apparatus 104 further comprises lid piercing means 122, here embodied as protrusions, intended for piercing the lid 109 of the closed capsule 102. The open capsule 2 according to FIG. 1 comprises a lid 9 having an exit filter which is not pierced by the lid piercing means 122.

The open capsule 2 as provided in the first apparatus 104 is also not pierced by the bottom piercing means 112. The fluid from the fluid dispensing device 105 enters the cavity 144 provided between the receptacle 103 and the open capsule 2 through the bore 114. The open capsule 2 comprises an entrance filter 15 provided in the bottom 7 adapted to drain fluid from the cavity 144 to the inner space 11 of the open capsule 2 for extracting desired substances from the extractable product, in this example approximately 4.5-8 grams (for example 5-6.5 grams) of roasted and ground coffee, for preparing, in this example a single cup of beverage from 30-200 ml, here coffee. Thus, more in general, in the example of FIG. 1, the bottom 7 comprises an entrance area, formed by the entrance filter 15 which is positioned at a distance from the bottom piercing means 112. The first apparatus 104 is arranged for bringing the fluid dispensing device 105 in fluid connection with the entrance area for supplying the fluid to the extractable product for preparing the beverage. The lid 9 is provided with openings 23 adapted to drain the prepared beverage from the capsule 2 to the outlet 126 of the system 1.

FIG. 2 shows a second apparatus 4 and a second, open, capsule 2. For the sake of clarity, only the elements that differ from FIG. 1 will be described here in detail. The open capsule 2 comprises an entrance filter 15 in the bottom 7 of the capsule 2. The entrance filter 15 comprises an amount of openings for supplying fluid from the fluid dispensing device 5 of the apparatus 4 to the inner space 11 of the capsule. The open capsule has a length h1 of approximately 23.7 mm±0.2 mm seen in an axial direction. The thickness t of the bottom 7 may be approximately 0.7 mm±0.05 mm.

The second apparatus 4 of the system 1 comprises a receptacle 3 having an upper part 3a and a support surface 24 adapted to enclose, in use, said open capsule 2. The upper part 3a is displaceable from a retracted position to an extended position to close the receptacle 3 and from an extended position to a retracted position in a retraction direction R to open the receptacle 3 to release the used capsule 2 from the receptacle 3. The fluid dispensing device 5 of the second apparatus 4 comprises lengthened bottom piercing means 12 (being lengthened with respect to the bottom piercing means of the first apparatus) comprising a piercing element 12a, such as a blade with a piercing end 12b. The lengthened bottomed piercing means 12 are intended for piercing the entrance filter 15 of the open capsule 2 for creating at least one opening in the entrance filter such that upon retraction of the receptacle the capsule 2 is moved in a retraction direction R of the receptacle 3.

The length of the piercing element 12 is chosen such that the piercing end 12b in the extended position as shown in FIG. 2 extends at least partially through the entrance filter 15 of the open capsule 2. The piercing element 12 preferably has a length that is chosen such that it in the extended position of the upper part 3a of the receptacle 3 pierces the open capsule 2 over at least 2.7% of its length along the longitudinal central axis of the capsule from the entrance filter 15 towards the lid 9 of the capsule 2. The entrance filter 15 according to the shown embodiment comprises a plurality of entrance openings provided in the bottom 7 of the open capsule 2. In this example the plurality of entrance openings is distributed over substantially the entire bottom 7. Thus, the fluid is supplied to the extractable product via the plurality of entrance openings, which causes the extractable product to be wetted over substantially the entire cross section of the capsule 2. Hence, a very homogeneous supply of fluid to the extractable product is obtained. In another (not shown) embodiment of the invention, the entrance filter 15 may be formed by a filtering paper, a flexible foil or the like material.

The system 1 shown in FIG. 2 is operated as follows for preparing a cup of coffee, wherein the extractable product is roasted and ground coffee.

The capsule 2 is placed in the receptacle 3. The upper part 3a of the receptacle 3 is extended towards the support surface 24 of the receptacle 3. Due to the displacement of the upper part 3a of the receptacle, the lengthened bottom piercing means 12 are activated to pierce the bottom 7 of the capsule 2, such that the lengthened bottom piercing means 12 extend at least partially through the entrance filter 15. Then the fluid, here hot water under pressure, is supplied to the extractable product in the inner space 11 through the openings of the entrance filter 15 and through the pierced opening, via the bore 14 and bore opening 14a provided in the piercing means 12. The water will wet the coffee grounds and extract the desired substances to form the coffee beverage.

The prepared coffee will drain from the capsule 2 through the exit openings 26 of the support surface 24, and may be supplied to a container such as a cup (not shown).

During use of the second apparatus, the lid 9 (of a second capsule) may at least partly stick to the support surface 24 and to the lid piercing means 22. After preparing the beverage, the upper part 3a of the receptacle is retracted in the retraction direction R such that the lengthened bottom piercing means 12 are retracted in the retraction direction R. Since the initial connection force between the lengthened bottom piercing means 12 and the entrance filter 15 is larger than the sticking force between the lid 9 of the second capsule 2 and the support surface 24 of the receptacle 3, the open capsule 2 is taken along with the lengthened bottom piercing means 22 in the retraction direction R. Consequently, the capsule 2 is removed from the receptacle 3 in an easy manner thereby preventing the capsule 2 of being stuck in the receptacle 3.

In FIG. 3 a second apparatus 4 of the system 1 according the invention is shown comprising a first, closed, capsule 102. For the sake of clarity, only the elements that differ from the apparatus 4 of the system 1 as shown and described with FIG. 2 are described here. In FIG. 3 a gap is drawn between the closed capsule 102 and the receptacle 3 for the sake of clarity. It will be appreciated that, in use, the capsule 102 may lie in contact with the receptacle 3. The closed capsule 102 has a length h2 of substantially 30 mm along a longitudinal central axis of said closed capsule 102. In the extended position of the receptacle 3, as shown in FIG. 3, the piercing element 12a of the lengthened bottom piercing means 12 extends through the closed capsule 102 over at least 21.7% (1 in FIG. 3) of its length h2 along the longitudinal central axis of the closed capsule 102. When using a closed capsule 102, the lengthened bottom piercing means 12 of the second apparatus 4 of the system 1 according to the invention provides optimal flow conditions for the fluid passing the capsule 102, prevents occurrence of preferential fluid flow paths through the extractable product and may compact the extractable product more intensively, which is advantageously for the quality of the prepared coffee.

In the foregoing specification, the invention has been described with reference to specific examples of embodiments of the invention. It will, however, be evident that various modifications and changes may be made therein without departing from the broader spirit and scope of the invention as set forth in the appended claims.

The capsule and parts thereof may be made of various materials, or various combinations of various materials. Also, the capsule may have various shapes. For example, the circumferential wall of the capsule may have any shape such as cylindrical, frustoconical or polygonal, such as hexagonal or octagonal. Also the bottom and the lid may have various shapes, including non flat shapes. Furthermore, the lengthened bottom piercing means may have different shapes, comprises different amount of piercing elements and may have different dimensions. Furthermore the receptacle may have different constructions as long as the upper part of the receptacle can be displaced to and retracted from the support surface.

However, other modifications, variations and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A system for preparing a predetermined quantity of beverage suitable for consumption using an extractable product, comprising:

a first exchangeable capsule, being a closed capsule, having a bottom and having a first length;

a second exchangeable capsule, being an open capsule, having a bottom comprising an entrance filter and a second length, said first length being larger than the second length;

a first apparatus comprising a receptacle with a support surface for holding the first capsule, the receptacle of the first apparatus having a shape complementary to a shape of the first capsule the first apparatus having bottom piercing means intended for piercing the bottom of the first capsule, and having a fluid dispensing device for supplying an amount of a fluid under pressure to the first capsule, the bottom piercing means of the first apparatus being displaceable together with the receptacle of the first apparatus from a retracted position to an extended position, said bottom piercing means of the first apparatus being arranged for in the extended position piercing the bottom of the first capsule when the first capsule is placed in the receptacle of the first apparatus, the receptacle of the first apparatus being further configured to hold a second capsule, the shape of the receptacle of the first apparatus being partly complementary to a shape of the second capsule, wherein the bottom piercing means of the first apparatus are arranged for in the extended position being positioned at a distance from the bottom of the second capsule when the second capsule is placed in the receptacle of the first apparatus, so that the entrance filter of the second capsule, when being used in the first apparatus, is not pierced by the bottom piercing means of the first apparatus and the bottom of the second capsule stays intact; and a second apparatus comprising a receptacle with a support surface for holding the second capsule, the receptacle of the second apparatus having a shape partly complementary to the shape of the second capsule, the second apparatus comprising lengthened bottom piercing means and a fluid dispensing device for supplying an amount of a fluid under pressure to the second capsule, the lengthened bottom piercing means of the second apparatus being longer than the bottom piercing means of the first apparatus, the lengthened bottom piercing means of the second apparatus being displaceable together with the receptacle of the second apparatus from a refracted position to an extended position, said lengthened bottom piercing means of the second apparatus being arranged for in the extended position piercing the entrance filter of the second capsule for creating at least one opening in the entrance filter of the second capsule when the second capsule is placed in the receptacle of the second apparatus, the receptacle of the second apparatus being further configured to hold the first capsule, the shape of the receptacle of the second apparatus being complementary to the shape of the first capsule;

wherein upon retraction of the receptacle of the second apparatus the second capsule is moved in a refraction direction of the receptacle.

2. The system of claim 1, wherein the second capsule comprises a circumferential wall, wherein the bottom is provided at a first end of the circumferential wall, and a lid at a second end of the circumferential wall opposite the bottom, wherein the wall, bottom and lid enclose an inner space comprising the extractable product, and wherein the lid comprises an exit area and the second apparatus comprises an outlet which, in use, is in fluid communication with the exit area for draining the prepared beverage from the second capsule and supplying the beverage to a container.

3. The system of claim 2, wherein an initial connection force between the lengthened bottom piercing means of the second apparatus and the entrance filter of the second capsule is larger than a sticking force between the lid of the second capsule and at least part of the support surface of the receptacle of the second apparatus.

4. The system of claim 2, wherein the lengthened bottom piercing means of the second apparatus comprises at least one piercing element having a length that is chosen such that a piercing end of the piercing element, in use, extends at least partially through the entrance filter of the second capsule.

5. The system of claim 4, wherein the length of the at least one piercing element is chosen such that it, in use, pierces the second capsule over at least 2.7% of its length along a longitudinal central axis of the second capsule from the entrance filter towards the lid of the second capsule.

6. The system of claim 4, wherein the length of the at least one piercing element is adapted to, in use, pierce the first capsule over at least 21.7% of its length along a longitudinal central axis of the first capsule from the bottom towards a lid of the first capsule.

7. The system of claim 6, wherein the first length of the first, capsule is 30 mm along a longitudinal central axis of the first capsule.

8. The system of claim 1, wherein a thickness of the entrance filter of the second capsule is approximately 0.65 mm to approximately 0.75 mm.

9. The system of claim 1, wherein the second length of the second capsule is 23.5 mm 23.9 mm along a longitudinal central axis of the second capsule.

10. The system of claim 1, wherein the entrance filter of the second capsule is selected from the group consisting of a flexible porous sheet, a flexible foil provided with a plurality of entrance openings, a polymeric film provided with a plurality of entrance openings, and a plurality of entrance openings provided in the bottom of the second capsule.

11. The system of claim 1, wherein the bottoms of both the first and second capsules are substantially flat, wherein sidewalls of the first and second capsules generally taper from the bottom to a top, and wherein the tops of the first and second capsules have larger surface areas than the bottoms of the first and second capsules.

* * * * *

UNITED STATES PATENT AND TRADEMARK OFFICE
CERTIFICATE OF CORRECTION

PATENT NO. : 9,131,799 B2
APPLICATION NO. : 13/316418
DATED : September 15, 2015
INVENTOR(S) : Ralf Kamerbeek et al.

It is certified that error appears in the above-identified patent and that said Letters Patent is hereby corrected as shown below:

IN THE CLAIMS

Column 8, line 44, replace -- refracted -- with "retracted"

Column 8, line 56, replace -- refraction -- with "retraction"

Signed and Sealed this
Twenty-second Day of March, 2016

Michelle K. Lee
*Director of the United States Patent and Trademark Office*